US010630131B2

(12) United States Patent
Haberkorn et al.

(10) Patent No.: US 10,630,131 B2
(45) Date of Patent: Apr. 21, 2020

(54) STATOR FOR AN ELECTRIC MACHINE, AND METHOD FOR PRODUCING SUCH A STATOR

(71) Applicant: Robert Bosch GmbH, Stuttgart (DE)

(72) Inventors: Konstantin Haberkorn, Stuttgart (DE); Christian Aumann, Stuttgart (DE); Tamas Csoti, Kisszallas (HU)

(73) Assignee: Robert Bosch GmbH, Stuttgart (DE)

( * ) Notice: Subject to any disclaimer, the term of this patent is extended or adjusted under 35 U.S.C. 154(b) by 406 days.

(21) Appl. No.: 15/541,970

(22) PCT Filed: Dec. 28, 2015

(86) PCT No.: PCT/EP2015/081263
§ 371 (c)(1),
(2) Date: Jul. 6, 2017

(87) PCT Pub. No.: WO2016/110424
PCT Pub. Date: Jul. 14, 2016

(65) Prior Publication Data
US 2017/0366060 A1 Dec. 21, 2017

(30) Foreign Application Priority Data
Jan. 7, 2015 (DE) .................. 10 2015 200 089

(51) Int. Cl.
*H02K 11/00* (2016.01)
*H02K 3/52* (2006.01)
(Continued)

(52) U.S. Cl.
CPC ............... *H02K 3/522* (2013.01); *H02K 3/28* (2013.01); *H02K 3/38* (2013.01); *H02K 15/0062* (2013.01); *H02K 2203/09* (2013.01)

(58) Field of Classification Search
CPC .................. H02K 3/522; H02K 3/28
(Continued)

(56) References Cited

U.S. PATENT DOCUMENTS 7,262,529 B2 *  8/2007  Klappenbach ......... H02K 3/522
                                                          310/71
9,601,958 B2 *  3/2017  Yamaguchi ............ H02K 3/522
(Continued)

FOREIGN PATENT DOCUMENTS

CN   101312309 A   11/2008
DE   202005016915    1/2006
(Continued)

OTHER PUBLICATIONS

International Search Report for Application No. PCT/EP2015/081263 dated Apr. 15, 2016 (English Translation, 3 pages).

*Primary Examiner* — Alexander Talpalatski
(74) *Attorney, Agent, or Firm* — Michael Best & Friedrich LLP (57) ABSTRACT

The invention relates to a stator (10) and to a method for producing a stator (10) for an electric machine (12), comprising a stator body (34) which has radial stator teeth (14) for receiving sub-coils (17) of an electric winding (16). An insulating plate (40) with guide elements (44) for connection wires (30, 31) is arranged between the sub-coils (17) on an end face (39) of the stator body (34), and a separately produced wiring plate (52) is arranged axially over the insulating plate (40), said wiring plate having conductor elements (63) for electrically contacting the connection wires (30, 31) with customer-specific connection plugs (56) of a controller. The wiring plate (52) is supported directly on the end face (39) of the stator body (34) by means of spacers (84).

19 Claims, 6 Drawing Sheets

(51) Int. Cl.
   *H02K 15/00*   (2006.01)
   *H02K 3/28*    (2006.01)
   *H02K 3/38*    (2006.01)

(58) Field of Classification Search
   USPC .......................................................... 310/71
   See application file for complete search history.

(56) References Cited

U.S. PATENT DOCUMENTS

| | | |
|---|---|---|
| 2004/0007934 A1 | 1/2004 | Michaels et al. |
| 2007/0296292 A1 | 12/2007 | Kienzler et al. |
| 2011/0316371 A1* | 12/2011 | Dietl ........................ H02K 3/50 |
| | | 310/71 |
| 2015/0188376 A1* | 7/2015 | Yamaguchi ............... H02K 3/28 |
| | | 310/71 |
| 2016/0111929 A1 | 4/2016 | Kessler et al. |

FOREIGN PATENT DOCUMENTS

| | | |
|---|---|---|
| DE | 202010017081 | 3/2011 |
| DE | 102012106471 | 2/2014 |
| DE | 102012224153 | 6/2014 |
| DE | 102013003024 | 8/2014 |
| JP | 2001178056 A | 6/2001 |
| JP | 2004336897 A | 11/2004 |
| JP | 2009290921 A | 12/2009 |
| JP | 2014150686 A | 8/2014 |

* cited by examiner

STATOR FOR AN ELECTRIC MACHINE, AND METHOD FOR PRODUCING SUCH A STATOR

BACKGROUND OF THE INVENTION

The invention relates to the stator for an electric machine, and to an electric machine, and to a method for producing a stator.

DE 10 2012 224 153 A1 has disclosed a stator of an electric machine, in the case of which an insulating lamination and an interconnect plate are arranged axially on a lamination stack. The stator is for example enwound with needle windings, wherein the individual sub-coils are connected to one another by means of connecting wires at the outer circumference of the interconnect plate. Here, the entire winding is wound continuously in unipartite fashion by means of a single winding wire.

For the electrical contacting of the winding with a control unit, it is necessary in said embodiment to provide a further, customer-specific terminal plate which has plug connections (not illustrated) to the control unit. A customer terminal plate of said type is mounted axially onto the interconnect plate, such that the axial manufacturing tolerances of the insulating lamination, of the interconnect plate and of the customer terminal plate are added together. As a result, the plug connections to the control unit do not have a clearly defined axial position, which can give rise to contacting problems with regard to the control unit.

SUMMARY OF THE INVENTION

The apparatus according to the invention and the method according to the invention have the advantage in relation to this that, as a result of the integral formation of axial spacers on the interconnect plate, the latter can be supported directly on the face surface of the stator body, without the interposition of further structural elements. As a result, the manufacturing tolerances of the insulating lamination and of a possible further interconnect disk are eliminated, whereby the tolerances for the terminal plugs are dependent only on the manufacture and installation of the interconnect plate with the conductor elements fastened thereto. With this short tolerance chain, very exact positioning of the terminal plugs with respect to a reference surface of the motor housing can be realized.

The interconnect plate is particularly expediently in the form of a closed plastics ring, the internal cutout of which can receive the rotor. On the plastics body, the holding elements for the terminal plugs are formed on one side in the axial direction, and the spacers, which bear against the face side of the stator body, are formed axially on the opposite side. Since the conductor elements with the terminal plugs are fixedly connected to the interconnect plate, it is possible by means of the integral form of the entire plastics body of the interconnect plate for the manufacturing tolerances with regard to the axial position of the plug connection to the control unit to be considerably reduced.

In order that a collision between the connecting wires of the individual sub-coils does not occur, the ring-shaped region of the interconnect plate is inserted radially within the guide elements of the insulating lamination. The guide elements thus constitute a radial separation between firstly the conductor elements, arranged within the guide elements, on the plastics ring and secondly the connecting wires arranged radially at the outside on the guide elements. In this way, an electrical short circuit in the interconnect is avoided.

The spacers are likewise integrally formed radially outside the guide elements and extend axially past the connecting wires to the face surface of the stator.

It is particularly advantageous for the spacers to be integrally formed axially exactly opposite the holding elements, because then, the force acting on the holding elements during the contacting of the control unit is optimally absorbed. Since the spacers are situated radially at the outermost circumference, they can advantageously be formed integrally with the holding elements via connecting struts, in particular by means of injection molding.

In order that the spacers can bear axially directly against the face side of the stator body, passage openings are correspondingly cut out axially in the insulating lamination, which passage openings allow free access to the uppermost sheet-metal lamination of the stator body. To prevent a collision of the spacers with the guide elements and connecting wires, the passage openings in the insulating lamination are likewise arranged at the radially outermost edge. In terms of manufacturing, the passage openings are formed in a very simple manner as radially open holes by means of injection molding, wherein, after the installation of the stator into the motor housing, the latter radially closes off the passage openings.

It is particularly advantageous if the spacers form a clip or detent connection with the passage openings, because then, the interconnect plate is reliably fixed in the axial direction—and in particular also with respect to the circumferential direction—until the conductor elements are connected to the connecting wires.

It is preferable for elastically movable detent elements to be integrally formed on the spacer, which detent elements are formed for example as resilient webs, the longitudinal axis of which extends approximately in the axial direction. On the resilient web there is then formed, for example, a detent hook which engages into a corresponding counterpart element on the passage opening.

For this purpose, it is for example the case that a cutout is formed in a circumferential direction on the wall of the passage opening axially toward the face side of the stator body, which cutout forms an axial undercut for the detent element.

Thus, during the axial insertion into the passage opening, the resilient web is deflected with respect to the circumferential direction, wherein, after the spacer has been fully inserted into the passage opening, the detent hook engages with detent action into the undercut in order to fix the interconnect plate axially to the stator body.

To also achieve reliable exact positioning with respect to the circumferential direction without additional outlay, the resilient webs on at least two spacers are arranged in opposite circumferential directions. In this way, said two spacers are braced against one another with respect to the circumferential direction, whereby tolerances can be compensated, which is necessary for the installation of the interconnect plate.

For exact axial positioning of the terminal plugs, the holding elements preferably have, in the region of their free axial ends, an axial abutment surface on which the terminal plugs are axially supported. For this purpose, the method for fastening the conductor elements on the interconnect plate, for example by means of plastics rivets, is decoupled from the axial positioning of the terminal plugs. In this way, any inaccuracies in the welding of the fastening sections to the connecting wires or in the connection of the central sections to the plastics body do not lead to any positional deviation of the terminal plugs with respect to the face side or the reference surface of the motor housing.

It is particularly expediently possible for the stator body to be constructed by means of the punched sheet-metal laminations, which have a sheet-metal section which is closed in the circumferential direction. Such a "full section" stator can be easily enwound, for example by means of needle winding methods, wherein a so-called tooth slant can optionally be generated by virtue of the sheet-metal laminations being rotationally offset relative to one another by a small angle in the circumferential direction. In this way, despite identically manufactured sheet-metal laminations, the detent torque of an electric motor can be considerably reduced.

Through the reduction of the axial tolerances in the installation of the interconnect plate, an electric machine according to the invention can be manufactured in which both the face side of the stator stack and the axial ends of the terminal plugs have an exactly predefined dimension relative to a reference surface on the motor housing. In this way, it is also possible for the bearing cover for the rotor of the electric machine to be exactly axially positioned, such that the leadthroughs thereof can receive the holding elements with the terminal plugs as plug base, whereby a clearly defined interface for the control unit is provided.

The production method of the stator with the method steps according to the invention has the advantage that, firstly, the interconnect plate bears directly against the face side of the stator body with small tolerance, and at the same time, through the design of the detent connection, the interconnect plate is reliably fixed to the stator body both axially and in the circumferential direction. This prevents, during the installation process, a displacement of the interconnect plate until the conductor elements of the interconnect plate have been firmly contacted with the connecting wires. Through the reduction of the axial tolerance chain, a clearly defined interface between the bearing cover with the terminal plugs to the connecting plugs of the control unit can be created.

BRIEF DESCRIPTION OF THE DRAWINGS

Exemplary embodiments of the invention are illustrated in the drawings and discussed in more detail in the following description. In the drawings:

FIG. 3, FIGS. 5 and 6 show an exemplary embodiment as per FIG. 3 with a first embodiment of a mounted interconnect plate.

DETAILED DESCRIPTION

Figure 1:
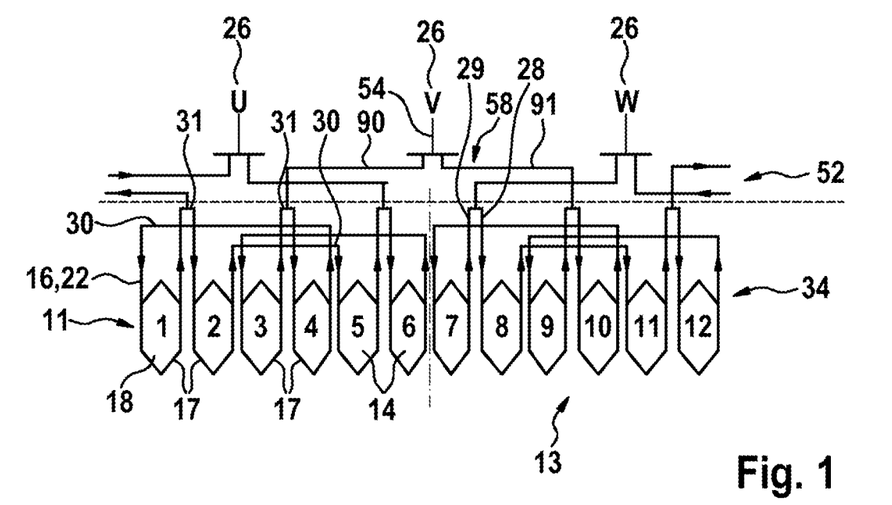
FIG. 1 schematically shows a winding diagram according to the invention.

FIG. 1 schematically illustrates a cut-open stator 10, on the stator teeth 14 of which the winding diagram of an electrical winding 16 is illustrated. The stator 10 has for example twelve stator teeth 14, wherein in each case always exactly one sub-coil 18 is wound onto each stator tooth 14. Here, in each case two sub-coils 18 situated immediately adjacent to one another are connected by means of a short connecting wire 31 to form an adjacent sub-coil pair 17. The winding is commenced for example with a first wire start 28 on the second stator tooth 14, and a connecting wire 30 is led to the fifth stator tooth 14. Immediately after the fifth stator tooth 14, the sixth stator tooth 14 is wound, such that said sub-coil pair 17 is connected by means of the short connecting wire 31 of two immediately adjacent sub-coils 18. After the sixth stator tooth 14, the winding wire 22 is led by means of the connecting wire 30 to the third stator tooth 14, in order there to form a sub-coil pair 17, which is connected by means of the connecting wire 31, to the fourth stator tooth 14. From the fourth stator tooth 14, the winding wire 22 is led via the connecting wire 30 in the first stator tooth 14, where the wire end 29 of the first winding strand 24 is arranged immediately adjacent to the wire start 28. The second winding strand 25 is wound, with a separate winding wire 22, correspondingly to the winding of the first winding strand 24, such that a further three sub-coil pairs 17 of immediately adjacently arranged sub-coils 18 are formed, which are connected by means of a short connecting wire 31. The wire start 28 and the wire end 29 of the two winding strands 24, 25 are in each case electrically connected to one another. In this embodiment, after the winding, it is always the case that two sub-coil pairs 17 are connected to form a phase 26, such that a total of exactly three phases U, V, W with in each case four sub-coils are formed. The first three sub-coil pairs 17 form an independent winding strand 24 which is wound from a separate winding wire 22 and which is insulated with respect to the second winding strand 25, which likewise has three sub-coil pairs 17 (as is illustrated by means of the dash-dotted line between the sixth and the seventh stator tooth 14). With such a winding, it would thus be possible for six separate phases to be actuated. In our embodiment, however, two radially exactly oppositely situated sub-coil pairs 17 composed of different winding strands 24, 25 are electrically connected to one another by means of conductor elements 58 of an interconnect plate 52 in order to reduce the electronic complexity of the control unit.

Figure 3:
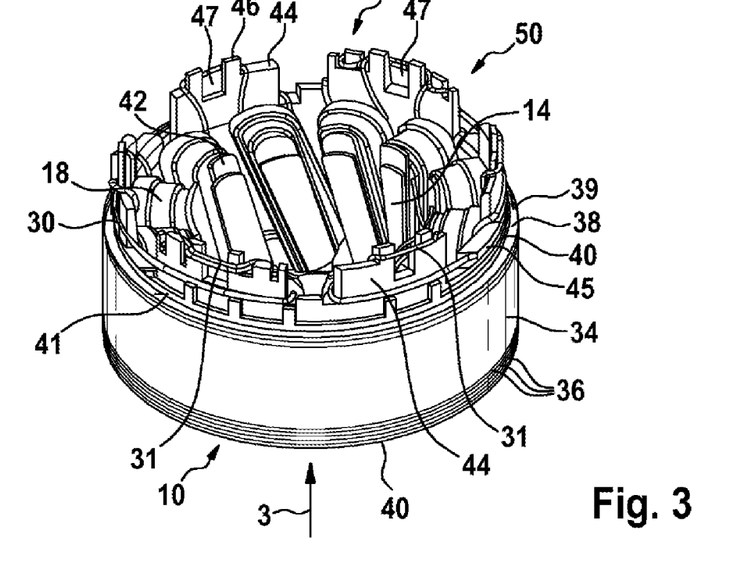
FIG. 3 shows a first exemplary embodiment of a wound stator with insulating lamination.

FIG. 3 now shows a three-dimensional view of a stator 14 which has been wound correspondingly to the winding diagram from FIG. 1. The stator 14 has a stator body 34 which is for example assembled from individual sheet-metal laminations 36. Here, the stator body 34 comprises a ring-shaped closed return yoke 38 on which the stator teeth 14 are radially inwardly integrally formed. In the interior, the stator 14 has a circular cutout 37 into which a rotor (not illustrated) can be inserted, as can be seen more clearly in FIG. 4. The stator teeth 14 extend inward in a radial direction 4 and along the rotor axis in an axial direction 3. In the exemplary embodiment, the stator teeth 14 are formed so as to be skewed in the circumferential direction 2 in order to reduce the detent torque of the rotor. For this purpose, it is for example the case that the sheet-metal laminations 36 are correspondingly rotationally offset with respect to one another in the circumferential direction 2. Before the stator body 34 is enwound, insulating laminations 40 are mounted onto the two axial face sides 39 in order to electrically insulate the winding wire 22 with respect to the stator body 34. At least one of the two insulating laminations 40 has a ring-shaped closed circumference 41, from which insulating teeth 42 extend in the radial direction 4, which insulating teeth cover the face sides 39 of the stator teeth 14. On the ring-shaped circumference 41 of the insulating lamination 40, there are formed guide elements 44 in which the connecting wires 30, 31 are led between the sub-coils 18. For this purpose, it is for example the case that grooves 45 in the circumferential direction 2 are formed on the outer circumference 41, such that the connecting wires 30, 31 are arranged in axially offset planes in order to prevent the connecting wires 30, 31 from crossing over. The short connecting wires 31 between the sub-coil pairs 17 are arranged in the uppermost axial plane, wherein in particular, all six connecting wires 31 for the contacting of the phase terminals all run in the same axial plane. For this purpose, two axial projections 46 are always formed between two sub-coils 18 of a sub-coil pair 17, which projections are separated from one another by an interposed radial aperture 47. Thus, the short connecting wires 31 of the sub-coil pairs 17 are freely accessible from all sides and, in particular in the region of the radial aperture 47, do not bear against the insulating lamination 40. The two wire starts 28 and wire ends 29 are, in this exemplary embodiment, fixed in a labyrinth arrangement 50, which is arranged in each case immediately adjacent, in the circumferential direction 2, to the two axial projections 46 which are spaced apart by a radial aperture 47. It can thus be seen in FIG. 3 that the wire start 28 of the first winding strand 24 runs, over the circumferential region of the radial aperture 47, parallel and immediately adjacent to the wire end 29 of the first winding strand 24. Here, the wire start 28 is arranged in a first labyrinth arrangement 50 on one side of the radial aperture 47, and the wire end 29 of the first winding strand 24 is arranged in a second labyrinth arrangement 50 opposite the radial aperture 47 in the circumferential direction. By means of this parallel arrangement of the short connecting wires 31, these can be electrically contacted in the same way as the connecting wires 31 of the continuously wound sub-coil pairs 17 for the purposes of the phase actuation.

Figure 4:
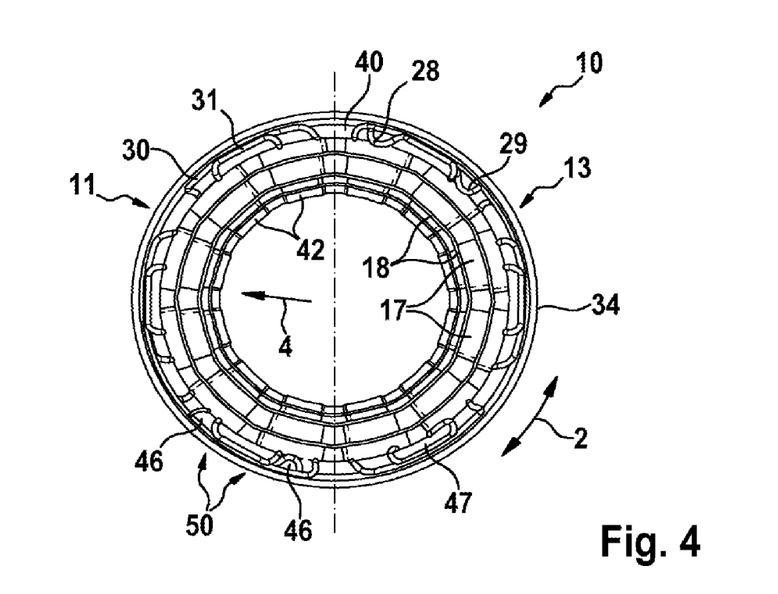
FIG. 4 shows a corresponding plan view as per

In FIG. 4, it can likewise be clearly seen that the two connecting wires 31 running parallel are arranged at the same radius. The free ends of the wire start 28 and of the wire end 29 end directly after the corresponding labyrinth arrangements 50, such that they do not protrude radially beyond the connecting wires 30, 31. The connecting wires 30, 31 all run in the circumferential direction 2 along the guide elements 44 and lie radially outside the sub-coils 18 wound onto the stator teeth 14. In FIG. 4, the two motor halves 11 are likewise schematically separated by the dash-dotted line, wherein the left-hand motor half 11 is electrically insulated with respect to the right-hand motor half 13. The electrical winding 16 is manufactured for example by means of needle winding, wherein the connecting wires 30, 31 can, by means of a winding head, be led radially outward between the sub-coils 18 and laid in the guide elements 44. In this embodiment, all connecting wires 30, 31 are arranged axially on one side of the stator body 34. In an alternative embodiment which is not illustrated, it is also possible for a part of the connecting wires 30, 31 to be laid onto the axially opposite side of the stator 14. Here, it is for example possible for the short connecting wires 31 for the contacting of the phase actuation to be arranged in a first insulating lamination 40, and for the other connecting wires 30, which connect the different sub-coil pairs 17 to one another in each case, to be led on the axially oppositely arranged insulating lamination 40.

Figure 5:
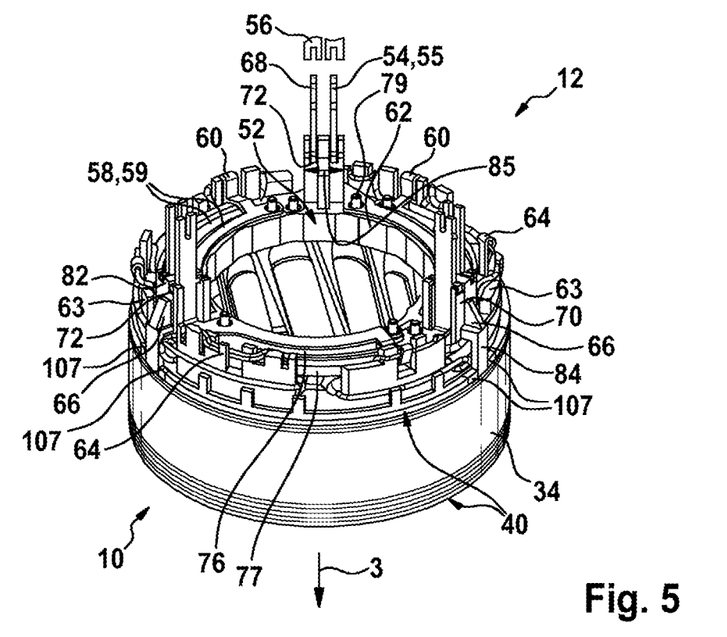

In FIG. 5, a first embodiment of an interconnect plate 52 has been mounted onto the embodiment of the stator 10 as per FIG. 3, by means of which interconnect plate the electrical winding 16 is actuated. For this purpose, the interconnect plate 52 has terminal plugs 54 to which the customer-specific connecting plugs 56 of a control unit can be joined. In this embodiment, exactly six terminal plugs 54 are provided, which are in each case electrically connected to one sub-coil pair 17 of the electrical winding 16. Here, exactly 6 phases 26 are formed by in each case exactly one sub-coil pair 17, such that the six terminal plugs 54 are contacted with exactly six connecting wires 31 of adjacent sub-coil pairs 17. For this purpose, the interconnect plate 52 has exactly six conductor elements 58 which, on an axially angled end, have the terminal plugs 54, and on the other end, have a fastening section 60 which is connected, for example welded, to the connecting wires 31. The interconnect plate 52 has a plastics body 62 which is formed as a closed ring through which the rotor can be inserted into the stator 10. On the plastics body 62 there are integrally formed holding elements 63 which extend away from the stator body 34 in the axial direction 3. The conductor elements 58 extend in the circumferential direction 2 along the plastics body 62, wherein the angled terminal plugs 54 are led in the axial direction 3 within the holding elements 63. On the other end, the conductor elements 58 have the fastening section 60, the free end of which is formed as a loop 64 which surrounds the connecting wire 31. Here, the loop 64 is formed from a sheet-metal material, the cross section of which is approximately rectangular. In the exemplary embodiment, the conductor elements 58 are formed as bent and punched parts 59 composed of sheet metal, such that the loop 64 can be bent out of the free end of the fastening section 60, during the installation thereof, around the connecting wire 31. After the arrangement of the open loop 64 around the connecting wire 31, it is for example the case that electrodes are laid onto both radially oppositely situated surfaces of the loop 64, which electrodes are pressed together in the radial direction 4 while being fed with current in order to weld the loop 64 to the connecting wire 31. Here, the insulating lacquer of the connecting wire 31 is melted, resulting in metallic cohesion between the fastening section 60 and the connecting wire 31. The loop 64 is laid around the connecting wire 31 in the region of the radial aperture 47, because in this region, no guide element 44 is arranged between the connecting wire 31 and the loop 64. As a result, sufficient free space is available for the electrodes to be laid on, such that a free limb end 65 of the loop 64 can be pressed against the fastening section 60, whereby the loop 64 is closed. Here, depending on the sub-coil pair 17, the loop 64 surrounds only a single connecting wire 31 or simultaneously surrounds 2 connecting wires 31 which run parallel to one another and which are formed from the wire start 28 and the wire end 29 of a single winding strand 24, 25. The terminal plugs 54 are for example formed as insulation-displacement connections 55 which, at their free axial end 68, have a notch 69 into which a wire or a clamping element of the corresponding connecting plug 56 of the customer can be inserted. For this purpose, it is for example the case that detent engagement means 124 are integrally formed on the end 68, which detent engagement means dig firmly into the corresponding connecting plug 56. Furthermore, a transverse web 70 is formed in the radial direction 4 on the terminal plug 54, which transverse web is correspondingly supported on an axial stop 72 of the holding element 63. Furthermore, on the holding element 63, a first guide surface 74 and a second guide surface 75 are formed which support the terminal plug 54 in the two opposite circumferential directions 2. This prevents the terminal plugs 54 from bending over or bending out in the circumferential direction 2 during the insertion of the connecting plugs 56, whereby the axial tolerances of the plug connection are ensured.

The conductor elements 58 are arranged at least partially radially adjacent to one another, whereby it is necessary for the fastening sections 60 of the inner conductor elements 58 to radially cross the outer conductor elements 58 in order to be contacted with the connecting wires 31. Therefore, the radially inner conductor elements 58 are arranged on an axially higher path 76, and the radially outer conductor elements 58 are arranged on an axially lower-lying path 77 of the plastics body 62. Here, the central sections 78, which are in the form of sheet-metal strips, of the conductor elements 58 bear areally against the plastics body 62 and are connected to the latter for example by means of rivet connections or detent components. For this purpose, it is for example the case that axial rivet pins 79 are formed on the plastics body 62, which rivet pins engage through into corresponding axial apertures 80 of the conductor elements 58. By means of heat, in particular ultrasound, the ends of the rivet pins 79 can be deformed to form a rivet head 81, which forms a form fit with the conductor elements 58.

Figure 6:
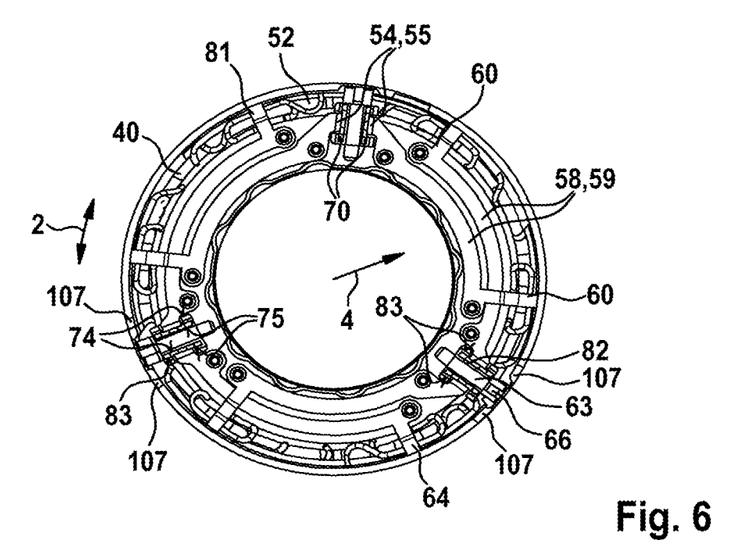

In the exemplary embodiment of FIGS. 5 and 6, it is always the case that two terminal plugs 54 are arranged in a common holding element 63, wherein said terminal plugs are separated from one another in the circumferential direction 2 by a central web 82 of the holding element 63. Here, the central web 82 forms, on both sides, in each case a first and a second guide surface 74, 75 for the respectively abutting terminal plugs 54. The second and first guide surfaces 75, 74 situated in each case opposite the central web 82 are formed by corresponding counterpart surfaces 83 which extend in the radial direction 4 and axial direction 3. In the region of the holding elements 63—axially opposite these—there are integrally formed spacers 84 which support the interconnect plate 52 axially with respect to the stator body 34. In the exemplary embodiment of FIGS. 5 and 6, exactly one holding element 63 has a greater width 85 in the circumferential direction 2 than the two other holding elements 63. In this way, a rotation prevention means is realized for a bearing cover (not illustrated) which is mounted axially with correspondingly shaped axial openings onto the holding elements 63.

FIG. 6 shows how the two terminal plugs 54 bear at both sides against the central web 82. Angled in each case in opposite circumferential directions 2, the respective central section 78 of the conductor element 58 is situated adjacent. Since the conductor elements 58 situated radially adjacent to one another are arranged on axially different paths 76, 77, said conductor elements do not make contact, such that they are electrically insulated with respect to one another. The inner ring of the plastics body 62 is of slightly undulating form in order that a punch tool for the insertion of the stator 10 into a motor housing can be engaged directly on the face side 39 of the radially inner regions of the stator teeth 14.

Figure 7:
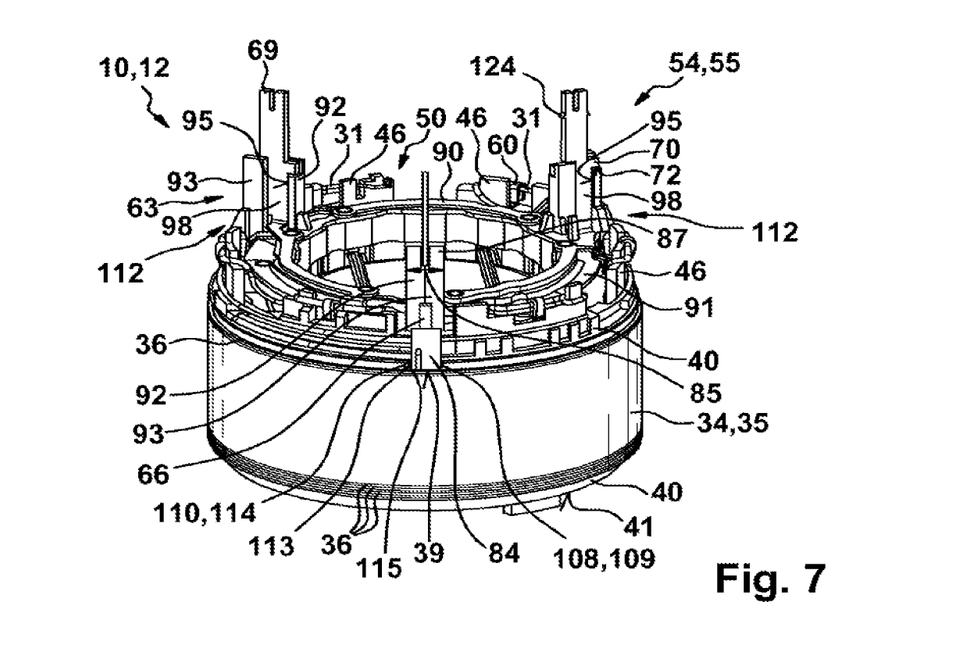
FIGS. 7 and 8 show an exemplary embodiment as per FIG. 3 with a second embodiment of a mounted interconnect plate.

In FIG. 7, as a further exemplary embodiment, an alternative interconnect plate 52 by means of which the electrical winding 16 is actuated has been mounted onto the embodiment of the stator 10 as per FIG. 3. This embodiment corresponds to the actuation with exactly three phases U, V, W according to the schematic illustration in FIG. 1. In this embodiment, the interconnect plate 52 has exactly three terminal plugs 54 onto which customer-specific connecting plugs 56 of a control unit can be joined. Each terminal plug 54 is a constituent part of a conductor element 58 which electrically connects a first sub-coil pair 17 to a second—in particular radially exactly oppositely situated—sub-coil pair 17. For this purpose, proceeding from the terminal plug 54 extending in the axial direction 3, a first branch 90 and a second branch 91 are arranged so as to be angled in the circumferential direction 2. The two branches 90, 91 together form approximately a semicircle and extend along the ring-shaped plastics body 62, wherein said branches, at their ends averted from the terminal plug 54, have fastening sections 60 for the electrical contacting with the connecting wires 30, 31 of the sub-coils 18. The first branch 90 of a first conductor element 58 is arranged radially within the second branch 91 of a second conductor element 58. The fastening section 60 of the first, inner branch 90 therefore crosses the second, outer branch 91 of the second conductor element 58 in the radial direction 4 without making contact therewith. Here, the radially inner branches 90 are arranged on an axially higher path 76 than the radially outer branches 91, which are arranged on an axially lower-lying path 77 of the plastics body 62. The conductor elements 58, which are in the form of sheet-metal strips, bear areally against the plastics body 62 and are connected to the latter for example by means of rivet connections or detent components. For this purpose, it is for example the case that axial rivet pins 79 are formed on the plastics body 62, which rivet pins engage into corresponding axial apertures 80 of the conductor elements 58. By means of heat, in particular ultrasound, the ends of the rivet pins 79 can be deformed to form a rivet head 81, which forms a form fit with the conductor elements 58. Thus, it is for example the case that each branch 90, 91 is fastened by means of in each case two rivet heads 81 to the interconnect plate 52, as can be seen particularly clearly in FIG. 8. On the plastics body 62, there are again integrally formed holding elements 63 which extend away from the stator body 34 in the axial direction 3 and receive the terminal plugs 54. The terminal plugs 54 are for example likewise formed, as in FIG. 5, as insulation-displacement connections 55 which, at their free axial end 68, have a notch 69 into which a wire or a clamping element of the corresponding connecting plug 56 of the customer can be inserted. In this embodiment, the holding elements 63 are of two-part form. A radially inner axial projection 92 forms a first guide surface 74 in a first circumferential direction 2, and a radially outer axial projection 93 forms the second guide surface 75 for the opposite circumferential direction 2. The two axial projections 92, 93 are arranged offset in the circumferential direction 2, such that the terminal plug 54 extends in the axial direction 3 between the guide surfaces 74, 75 of said axial projections. The axial projections 92, 93 have in each case one support surface 95 with respect to the radial direction 4, against which the terminal plug 54 is radially supported. For this purpose, the axial projections 92, 93 have for example an L-shaped or U-shaped cross section transversely with respect to the axial direction 3. With respect to the axial direction 3, the radially extending transverse web 70 is supported on axial stops 72 of the holding element 63. The axial projections 92, 93 are offset in the radial direction 4 to such an extent that they do not overlap in the radial direction 4. In this way, openings 98 are formed in the holding element 63 in each case in both circumferential directions 2, from which openings the two branches 90, 91 emerge from the holding element 63 in opposite circumferential directions 2. In order that the conductor elements 58 can be installed axially into the holding elements 63, the openings 98 are upwardly open in the axial direction 3. The angled portions 100 of the branches 90, 91 toward the terminal plug 54 are arranged radially adjacent to one another and in axially different planes, in order that the branches 90, 91 can extend on the axially different paths 76, 77 of the plastics body 62.

Figure 8:
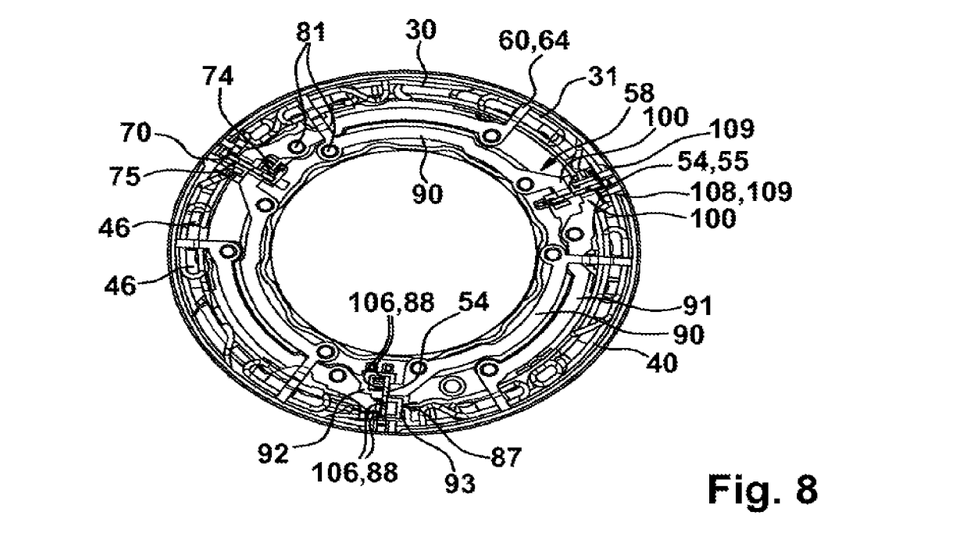

It can be seen from FIG. 8 that the branches 90, 91 are arranged radially in the region of the stator teeth 14 and radially within the guide elements 44 of the insulating lamination 40. The three holding elements 63 are arranged so as to be uniformly distributed in the circumferential direction 2 at intervals of approximately 120°. Again, one holding element 63 has, as a rotation prevention means, a relatively large width 85 in the circumferential direction 2. For this purpose, the two axial projections 92, 93 are of U-shaped form, such that their free limbs 87 point toward one another in the circumferential direction 2. The face surfaces 88 of the free limbs 87 in this case form guide surfaces 106 in the circumferential direction 2 (which correspond to the first and second guide surfaces 74, 75) between which the terminal plugs 52 are arranged.

Figure 2:
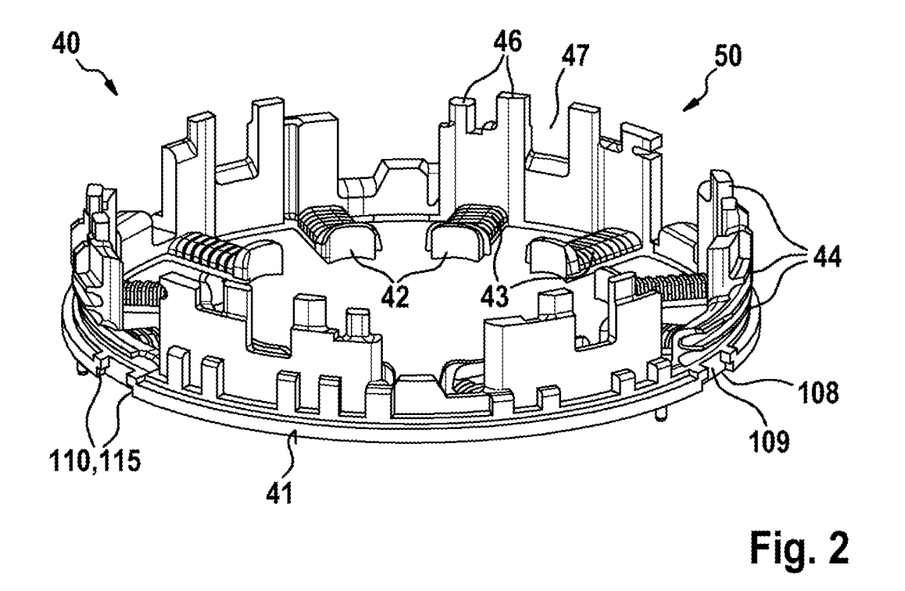
FIG. 2 shows an insulating lamination according to the invention.

FIG. 2 illustrates an embodiment according to the invention of an insulating lamination 40 without a stator body 34. The radial insulating teeth 42 have grooves 43 for the compact enwinding of the individual sub-coils 17. The guide elements 44, which are arranged so as to be distributed over the entire circumference and which extend axially, form the radial separation between the sub-coils 17 (not shown here) and the connecting wires 30, 31. On the ring-shaped circumference 41 there are formed—for example three—axial passage openings 108 into which spacers 84 (not yet illustrated) of an interconnect plate 52 can extend through in order to be supported directly on the stator body 34. The insulating lamination 40 bears axially likewise directly against the face side 39 of the stator body 34, which is formed directly by the axially outermost sheet-metal lamination 36. The outer circumference 41 extends radially approximately as far as the outer circumference of the lamination stack 35. Here, the passage openings 108 are of radially open form in order that the spacers 84 bear against the radially outermost edge of the stator body 34. On the edge 109 of the passage opening 108 there are formed, as counterpart detent elements 111, undercuts 115 with which the corresponding detent elements 110 of the spacers 84 form a detent connection 112. The undercuts 115 are cut out on that axial side of the insulating lamination 40 which faces axially towards the stator body 34, and thus form a detent surface at which the detent elements 110 of the spacers 84, with detent hooks 113, can firmly clamp axially against the stator body 34. The undercuts 115 extend for example in the circumferential direction 2, preferably at both edges 109 situated opposite in the circumferential direction 2. Said undercuts extend, in the exemplary embodiment, as far as the radially outer edge 41 of the insulating lamination 40. The passage openings 108 extend radially inward, and the undercuts 115 extend no further inward than the outer circumference of the connecting wires 30, 31.

Figure 9:
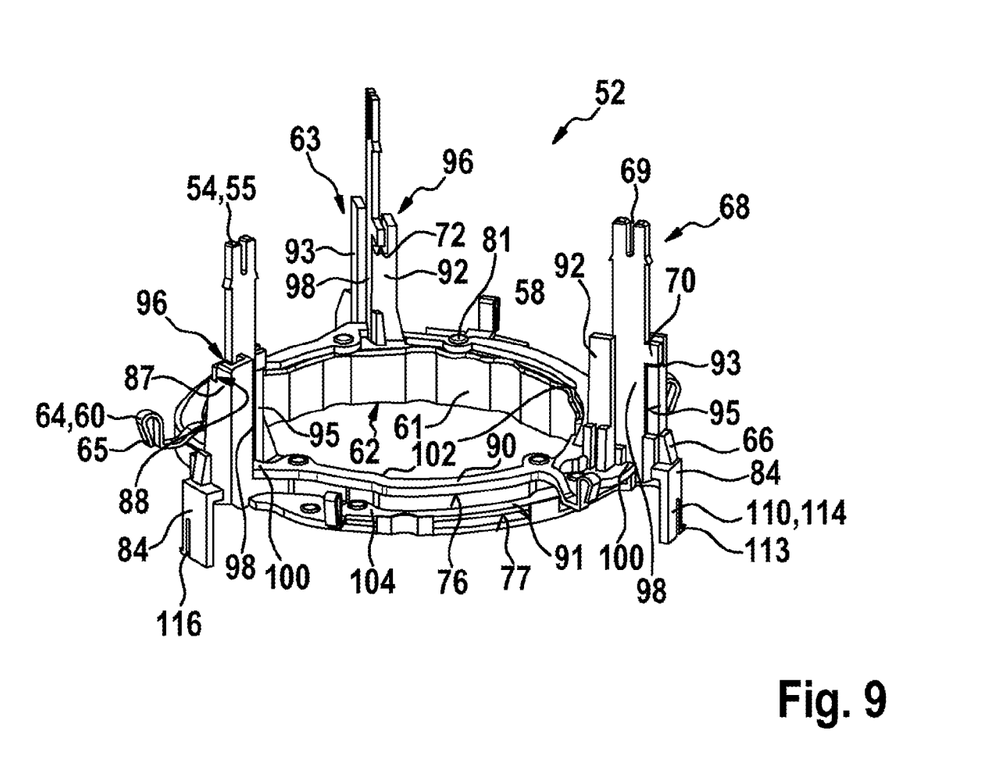
FIG. 9 shows the interconnect plate as per FIGS. 7 and 8 without a stator.

After the insulating lamination 40 arranged on the stator body 34 has been enwound, an interconnect plate 52 as per FIGS. 5-8 is inserted axially over the insulating lamination 40. The interconnect plate 52 of FIG. 7 is illustrated once again in FIG. 9, without a stator body 34 and on an enlarged scale. The free ends of the fastening sections 60 are, as in FIG. 5, again formed as loops 64, which are still open before the installation of the conductor elements 58 and which, after the installation thereof, surround the connecting wires 31. As can be seen in FIG. 9, the spacers 84 are integrally formed, in unipartite fashion with the holding elements 63, axially opposite these on the plastics body 62. The spacers 84 project beyond the ring-shaped plastics body 62 of the interconnect plate 52 in the axial direction 3 and are integrally formed radially outside the plastics ring 62. Here, said spacers are connected to the interconnect plate 52 in unipartite fashion by means of support webs 66. During the mounting onto the stator body 34, the spacers 84 engage over the connecting wires 30, 31 in the radial direction 4 in order to engage, outside said connecting wires, axially into the passage openings 108 of the insulating lamination 40.

In this way, the interconnect plate 52 with the terminal plugs 54 can be supported directly on the stator body 34 without any intermediate components. In the exemplary embodiment, three holding elements 63 and therefore also three corresponding passage openings 108 are formed, which are preferably distributed uniformly over the circumference. The detent elements 110 are formed in unipartite fashion on the spacers 84, which detent elements engage into the counterpart detent elements 111 of the insulating lamination 40 in order to reliably fix the interconnect plate 52 to the stator body 34. The detent elements 110 are formed as spring tongues 114 which extend in the axial direction 3 approximately parallel to the spacers 84 and which are of resilient form at least with respect to the circumferential direction 2. An axial gap 116 is thus formed, toward which the detent element 110 is pushed during the insertion into the passage opening 108. On the free end of the detent elements 110 there are integrally formed detent hooks 113 which, when the spacers 84 have been fully inserted, engage with detent action into the undercuts 115 in the circumferential direction 2 and form an axial form fit. If the detent elements 110 are arranged such that two of them engage with detent action with the counterpart detent elements 111 in opposite circumferential directions 2, the interconnect plate 52 is also reliably exactly positioned relative to the sheet-metal lamination stack 35 with respect to the circumferential direction 2. For example, it is thus the case that only exactly two spacers 84 have in each case exactly one detent element, wherein in each case two counterpart detent elements 113 are formed on at least two passage openings 108. In the exemplary embodiment, the third spacer 84 has no detent element 110, in order that said third spacer can be manufactured with greater precision with respect to the circumferential direction 2, in order, with respect to the circumferential direction 2, to form an exact fit with the third passage opening 108, on which preferably no counterpart detent elements 111 are integrally formed.

In the embodiment as per FIG. 5, the passage openings 109 are formed such that, on the outer circumference 41 of the insulating lamination 44, there are integrally formed radial holding webs 107 which position the spacers 84 in the circumferential direction 2. Here, the radius of the circumference 41 is smaller than the radius of the stator body 34, such that the cross section of the spacer 84 fits radially into said radius difference. In this embodiment, no detent elements 110 are integrally formed on the spacer 84, and no counterpart detent elements 113 are integrally formed on the insulating lamination 40. In the embodiment as per FIG. 7, the radius of the circumference 41 is approximately equal to the radius of the stator body 34, such that the passage openings 108 are cut out of the circumference 41 of the insulating lamination 44. Here, the spacers 84 have detent elements 110 which engage into the corresponding counterpart detent elements 113 of the passage openings 108.

Figure 10:
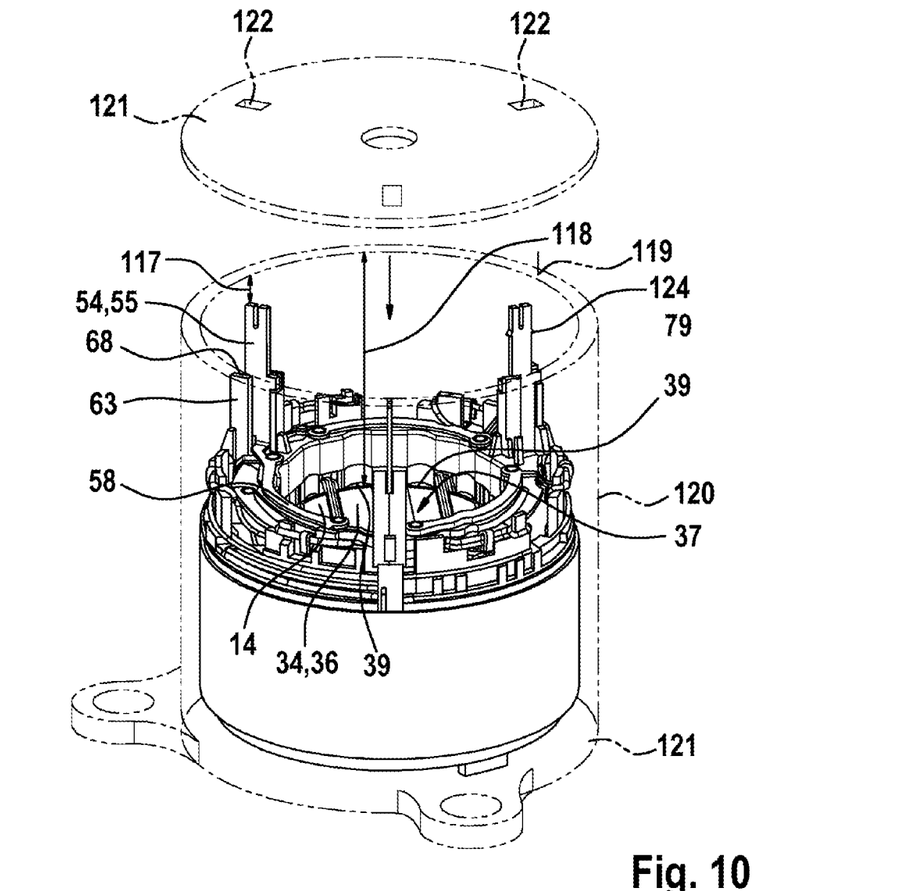
FIG. 10 shows a stator inserted into a motor housing.

In FIG. 10, the stator 10 has been inserted into a motor housing 120, preferably by shrink-fitting. Here, from a manufacturing aspect, the face surface 39 of the stator body 34 is fastened with a defined spacing 118 to a reference surface 119 of the motor housing 120. By virtue of the fact that the interconnect plate 52 with the spacers 84 bears directly against the face surface 39, the free ends 68 of the terminal plugs 54 of the interconnect plate 52 also have a defined spacing 117 to the reference surface 119. It is thus possible for a bearing cover 121 to be inserted axially into the motor housing 120 into a defined position relative to the reference surface 119, such that the holding elements 63 project through corresponding apertures 122 in the bearing cover 121. To form the rotation prevention means, at least one aperture 122 has a different contour and is for example of wider form in the circumferential direction 2 than the other two apertures 122. By means of this manufacturing method, an exactly reproducible interface for the control unit is provided.

The invention claimed is:

1. A stator (10) for an electric machine (12), the stator comprising a stator body (34) which has radial stator teeth (14) for accommodating sub-coils (17) of an electrical winding (16), wherein, on a face side (39) of the stator body (34), there is arranged an insulating lamination (40) with guide elements (44) for connecting wires (30, 31) between the sub-coils (17), wherein, axially above the insulating lamination (40), there is arranged a separately manufactured interconnect plate (52) which has conductor elements (58) for the electrical contacting of the connecting wires (30, 31) with customer-specific connecting plugs (56) of a control unit, wherein the interconnect plate (52) has a closed ring (61) as a plastic body (62), an inner recess of which accommodates the rotor, characterized in that the interconnect plate (52) is supported directly, by means of spacers (84), on the face side (39) of the stator body (34), and wherein the closed ring (61) is arranged radially inside, and the spacers (84) are arranged radially outside, the guide elements (44) and the connecting wires (30, 31) arranged therein.

2. The stator (10) as claimed in claim 1, the plastic body (62) having thereon axially integrally formed holding elements (63) which extend in an axial direction (3) and which accommodate terminal plugs (54) of the conductor elements (63) for connection to the connecting plugs (56), wherein the spacers (84) extend axially oppositely to the holding elements (63) and project axially beyond the ring (61).

3. The stator (10) as claimed in claim 1, characterized in that the spacers (84) are integrally formed in a circumferential region of the holding elements (63) and are connected integrally to the holding elements (63) by means of support webs (66).

4. The stator (10) as claimed in claim 1, characterized in that, in the insulating lamination (40), there are formed axial passage openings (108) through which the spacers (84) extend in order, without bearing axially against the insulating lamination (40), to be supported directly against the face surface (39).

5. The stator (10) as claimed in claim 4, characterized in that the passage openings (108) are cut out on a outer radial circumference (41) of the insulating lamination (40).

6. The stator (10) as claimed in claim 1, characterized in that the spacers (84) have detent elements (110) which, together with counterpart detent elements (111) on the insulating lamination (40), form a detent connection (112).

7. The stator (10) as claimed in claim 6, characterized in that the detent elements (110) have spring tongues (114) which extend in an axial direction (3) and which have a detent hook (113) at their free end.

8. The stator (10) as claimed in claim 7, characterized in that the counterpart detent elements (111) are formed as an undercut (115) with respect to the axial direction (3) on the edge (109) of the passage opening (108).

9. The stator (10) as claimed in claim 8, characterized in that the spring tongue (114), during axial insertion into the passage opening (108), is pushed in a circumferential direction (2) against the spacer (84) and, in a fully installed position, springs back in the opposite circumferential direction (2) again such that the detent hook (113) forms an axial form fit with the undercut (115).

10. The stator (10) as claimed in claim 6, characterized in that in each case at least one detent element (110) is formed on two spacers (84) which are directly adjacent in a circumferential direction (2), wherein said detent elements (110) point toward one another or away from one another in the circumferential direction (2) in order to compensate any tolerances in the circumferential direction (2) between the insulating lamination (40) and the interconnect plate (52).

11. The stator (10) as claimed in claim 2, characterized in that the terminal plugs (56) are in the form of wire pins or in the form of bent and punched parts (59) with an insulation-displacement connection (55), which extend axially within the holding elements (63) and are supported axially on an axial stop (72) of the holding elements (63), wherein central sections (78), which are angled at approximately 90°, of the conductor elements (58) extend in a circumferential direction (2) along the plastic body (62).

12. The stator (10) as claimed in claim 1, characterized in that the stator body (34) is assembled from a multiplicity of stator laminations (36), which lie one on top of the other and which are of integrally closed form in a circumferential direction (2), to form a lamination stack (35), and the face surface (39) is formed by an outer stator lamination (36).

13. An electric machine (12) having a stator (10) as claimed in claim 2, characterized in that the stator (10) is fastened in a cylindrical motor housing (120), wherein the face surface (39) has an exactly predefined axial spacing (118) to a reference surface (119) of the motor housing (120), whereby at the same time free ends (68) of the terminal plugs (54) are positioned with an exactly predefined axial spacing (117) to the reference surface (119).

14. A method for producing a stator (10) as claimed in claim 6, characterized by the following method steps:
   joining an insulating lamination (40) axially onto the face surface (39) of the stator body (34),
   subsequently winding the stator body (34) with sub-coils (18), wherein connecting wires (30, 31) are laid between the sub-coils (18) in the guide elements (44) of the insulating lamination (40),
   subsequently joining the interconnect plate (52) onto the stator body (34) such that the detent elements (110) of the spacer (84) engage with detent action in the passage openings (108) of the insulating lamination (40) and fix the interconnect plate (52) on the stator body (34),
   subsequently electrically connecting the conductor elements (58) of the interconnect plate (52) to the connecting wires (30, 31),
   subsequently inserting the stator body (34) in the motor housing (120), with an exactly predefined axial spacing (118) of the face surface (39) to a reference surface (119) of the motor housing (120), and
   subsequently positioning the bearing cover axially with respect to the reference surface (119) in order to close off the motor housing (120), wherein the terminal plugs (54) together with the holding elements (63) are led out of the housing interior through the apertures (122) of the bearing cover (121).

15. The stator (10) as claimed in claim 4, characterized in that the passage openings (108) are cut out on a outer radial circumference (41) of the insulating lamination (40) and are formed so as to be radially outwardly open.

16. The stator (10) as claimed in claim 7, characterized in that the counterpart detent elements (111) are formed as an undercut (115) with respect to the axial direction (3) on the edge (109) of the passage opening (108), wherein, at a passage opening (108), an undercut (115) is formed in each case in both opposite circumferential directions (2).

17. The stator (10) as claimed in claim 2, characterized in that the terminal plugs (56) are in the form of wire pins or in the form of bent and punched parts (59) with an insulation-displacement connection (55), which extend axially within the holding elements (63) and are supported axially on an axial stop (72) of the holding elements (63), wherein central sections (78), which are angled at approximately 90°, of the conductor elements (58) extend in a circumferential direction (2) along the plastic body (62), wherein the conductor elements (63) are fastened to the interconnect plate (52) by means of plastic material deformation of the plastic body (62), and fastening sections (60), which are situated opposite the terminal plugs (58), of the conductor elements (58) are electrically connected to the connecting wires (30, 31).

18. The stator (10) as claimed in claim 1, characterized in that the stator body (34) is assembled from a multiplicity of stator laminations (36), which lie one on top of the other and which are of integrally closed form in a circumferential direction (2), to form a lamination stack (35), and the face surface (39) is formed by an outer stator lamination (36), wherein the stator laminations (36) are rotationally offset with respect to one another in the circumferential direction (2) so as to form skewed stator teeth (14).

19. The stator (10) as claimed in claim 1, wherein the guide elements constitute a radial separation between firstly the conductor elements, arranged within the guide elements, on the plastics ring and secondly the connecting wires arranged radially at the outside on the guide elements.

* * * * *